Sept. 8, 1953     W. T. HIRSCH ET AL     2,651,320
GATE VALVE

Filed March 31, 1949                                5 Sheets-Sheet 1

ATTEST
Melvin C. Flint

INVENTORS
William T. Hirsch
Ernest R. Roth
BY
Norbert E. Birch
Attorney

Sept. 8, 1953  W. T. HIRSCH ET AL  2,651,320
GATE VALVE
Filed March 31, 1949  5 Sheets-Sheet 2

ATTEST
Melvin C. Flint

INVENTORS
William T. Hirsch
Ernest R. Roth
BY
Norbert E. Buck
Attorney

Sept. 8, 1953     W. T. HIRSCH ET AL     2,651,320
GATE VALVE
Filed March 31, 1949     5 Sheets-Sheet 3
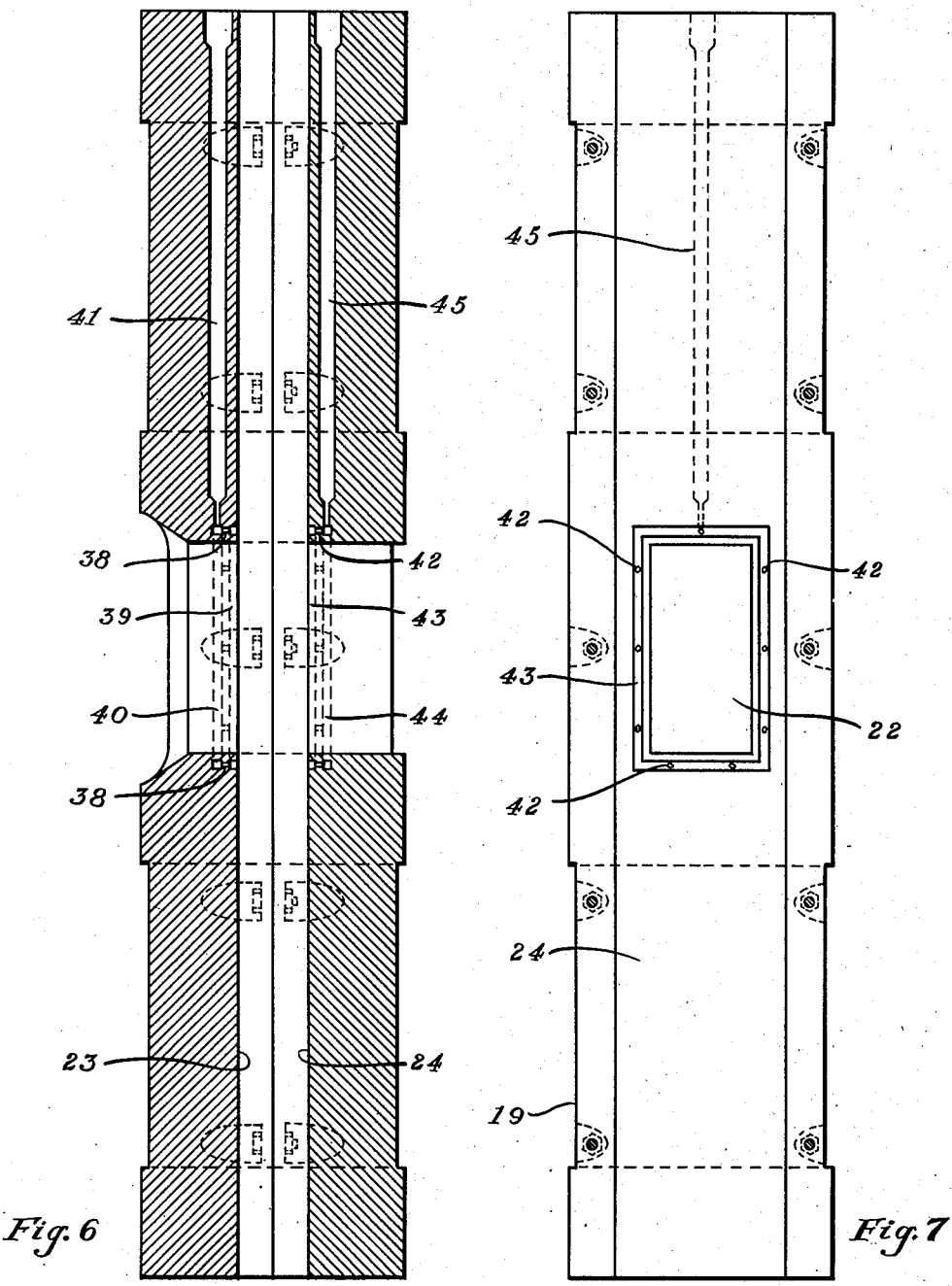
INVENTORS
William T. Hirsch
Ernest R. Roth Sept. 8, 1953     W. T. HIRSCH ET AL     2,651,320
GATE VALVE Filed March 31, 1949     5 Sheets-Sheet 4

ATTEST

INVENTORS
William T. Hirsch
Ernest R. Roth
BY
Attorney

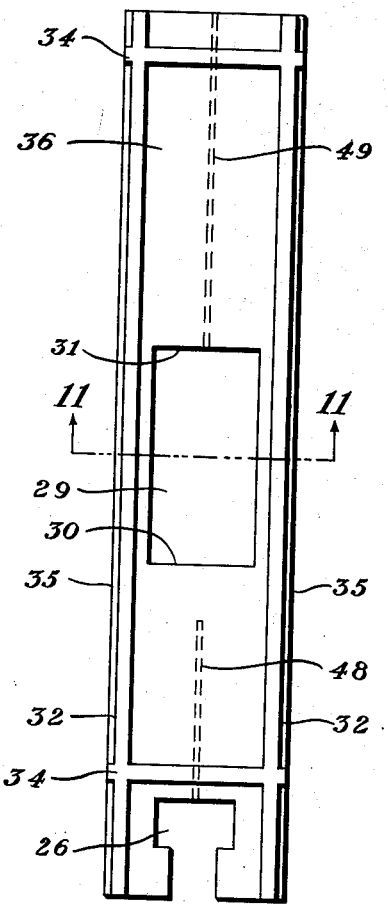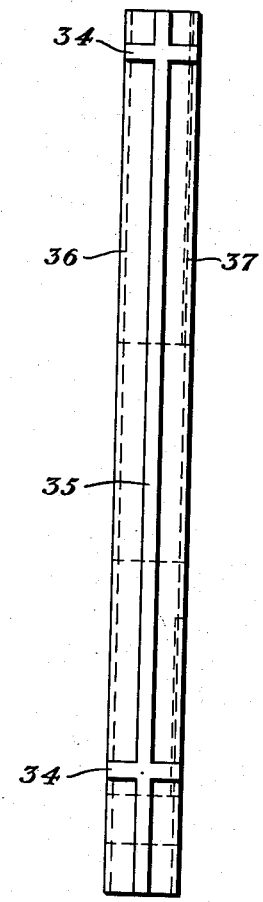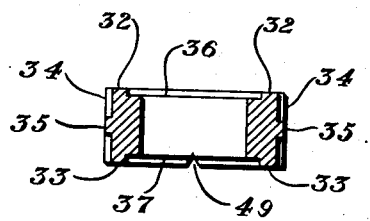

Patented Sept. 8, 1953

2,651,320

UNITED STATES PATENT OFFICE 2,651,320

GATE VALVE

William T. Hirsch, Havertown, and Ernest R. Roth, Norwood, Pa., assignors to The Atlantic Refining Company, Philadelphia, Pa., a corporation of Pennsylvania Application March 31, 1949, Serial No. 84,498

10 Claims. (Cl. 137—246)

This invention relates to new and useful improvements in valves, and in particular to gate valves such as those employed in fluid catalytic cracking units for controlling the flow of catalyst. Such valve is also useful in controlling the flow of any fluids containing suspended solid particles.

Fluid catalytic cracking units for the conversion of gas oil to motor fuel of high octane number comprise generally a reactor vessel and a regenerator vessel. Gas oil is commingled with a suitable fluid catalyst and the mixture passed through a reactor riser or pipe into the reactor vessel maintained at a temperature of 900° F., for example, wherein the gas oil is converted into motor fuel of relatively high octane number. During the reaction the catalyst becomes coated with carbonaceous residue or byproduct which decreases the effectiveness thereof.

The spent catalyst is passed from the reactor vessel through a reactor standpipe, which is controlled by one or more gate valves. The purpose of the valves is to maintain a desired level of catalyst in the reactor vessel by controlling the rate of flow of spent catalyst through the reactor standpipe. The spent catalyst, to which has been added a stream of air, is then passed through a regenerator riser or pipe into the regenerator vessel maintained at a temperature of about 1,000° F., for example, wherein the carbonaceous coating is caused to be removed, thereby reactivating the spent catalyst. Reactivated catalyst is returned to the process through a valve controlled regenerator standpipe, the flow of catalyst through the standpipe being controlled by one or more gate valves similar to the valves provided in the reactor standpipe.

What is called a fluid catalyst is generally a powdered aluminum silicate which has been aerated with a gas, such, for example, as air, at a pressure sufficient to fluidize the aluminum silicate. In this state, the catalyst possesses the flow characteristics of fluid mediums and the fluid catalyst may be caused to flow through pipes at a rate controlled by valves suitably provided therein.

In practice, it has been found that when using conventional gate valves for controlling the flow of fluid catalyst in a fluid catalytic cracking unit, the catalyst enters the close clearances between the gate and valve seat thereby causing extreme erosion and corrosion of the valve with consequent loss of control of catalyst flow. In an attempt to obviate this difficulty, the close clearances were reduced to a minimum; however, manipulation of the gate was then found to be impossible.

Accordingly, one object of the invention is to provide an improved gate valve having means whereby the surfaces of the valve gate and the seating surfaces of the valve are maintained substantially free of the fluid being controlled by the valve.

Another object is to provide a valve having means for continuously introducing aeration fluid between the surfaces of the valve gate and the seating surfaces.

A further object is to provide an improved gate valve which may be repaired readily without removing the valve body from its position in the flow line or pipe.

Other objects and features of the invention will be apparent from the description and drawings which follow.

Figure 6 is a cross-sectional view taken along the line 6—6 of Figure 4.

Figure 7 is a cross-sectional view taken along the line 7—7 of Figure 5.

Figure 10 is a plan view of the valve gate removed from the control member.

Figure 11 is a cross-sectional view taken along the line 11—11 of Figure 10.

Figure 12 is a side view of the valve gate shown in Figure 10.

Figure 1:
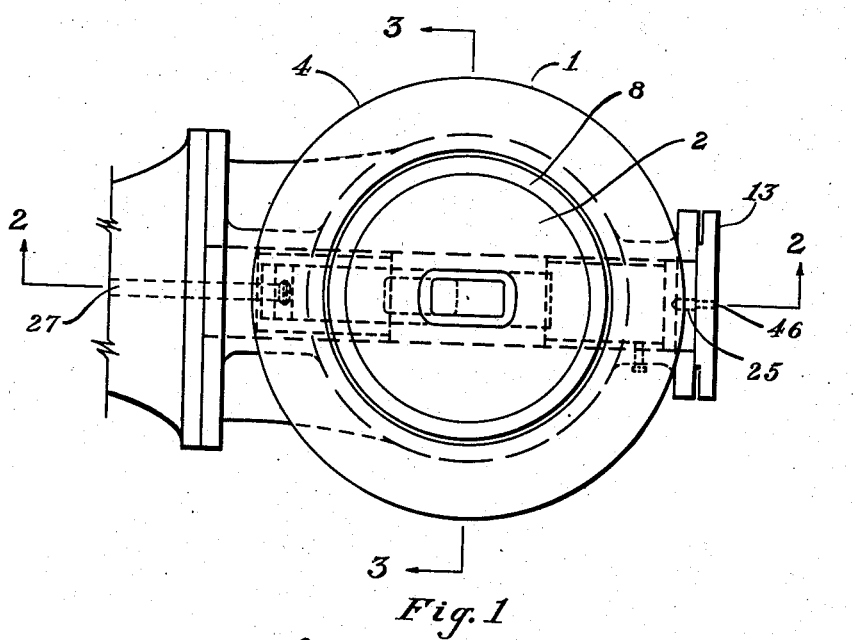
Figure 1 is a plan view of a valve constructed in accordance with the invention and showing the input end with the valve partially open.

Referring to the drawings, and in particular to

Figure 2:
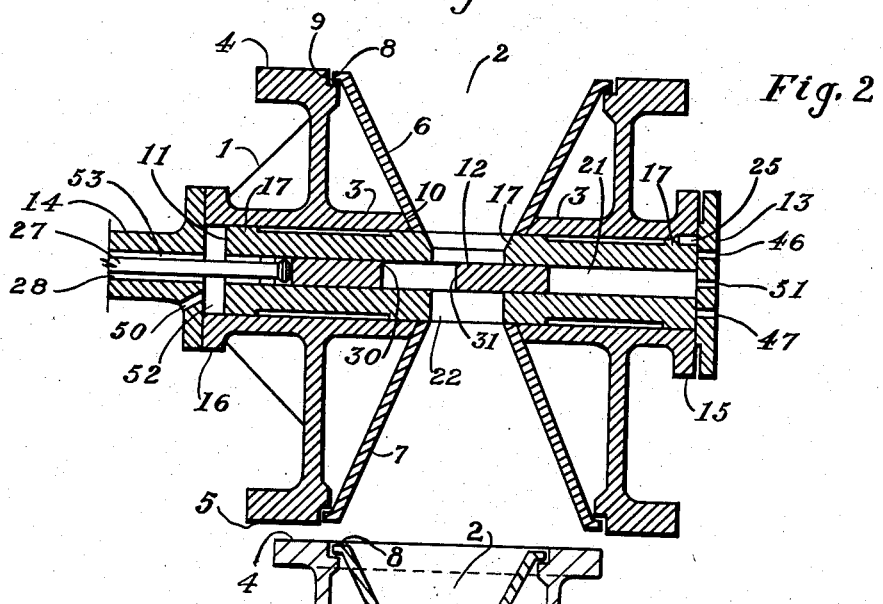
Figure 2 is a cross-sectional view taken along the line 2—2 of Figure 1 showing the control member removably secured within the valve body.
Figure 3:
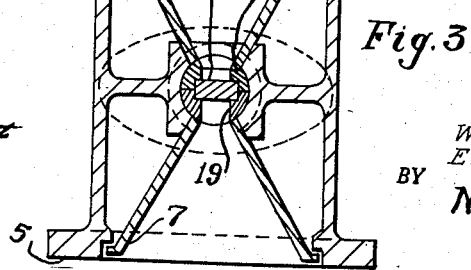
Figure 3 is a cross-sectional view taken along the line 3—3 of Figure 1.
Figures 4, 5:
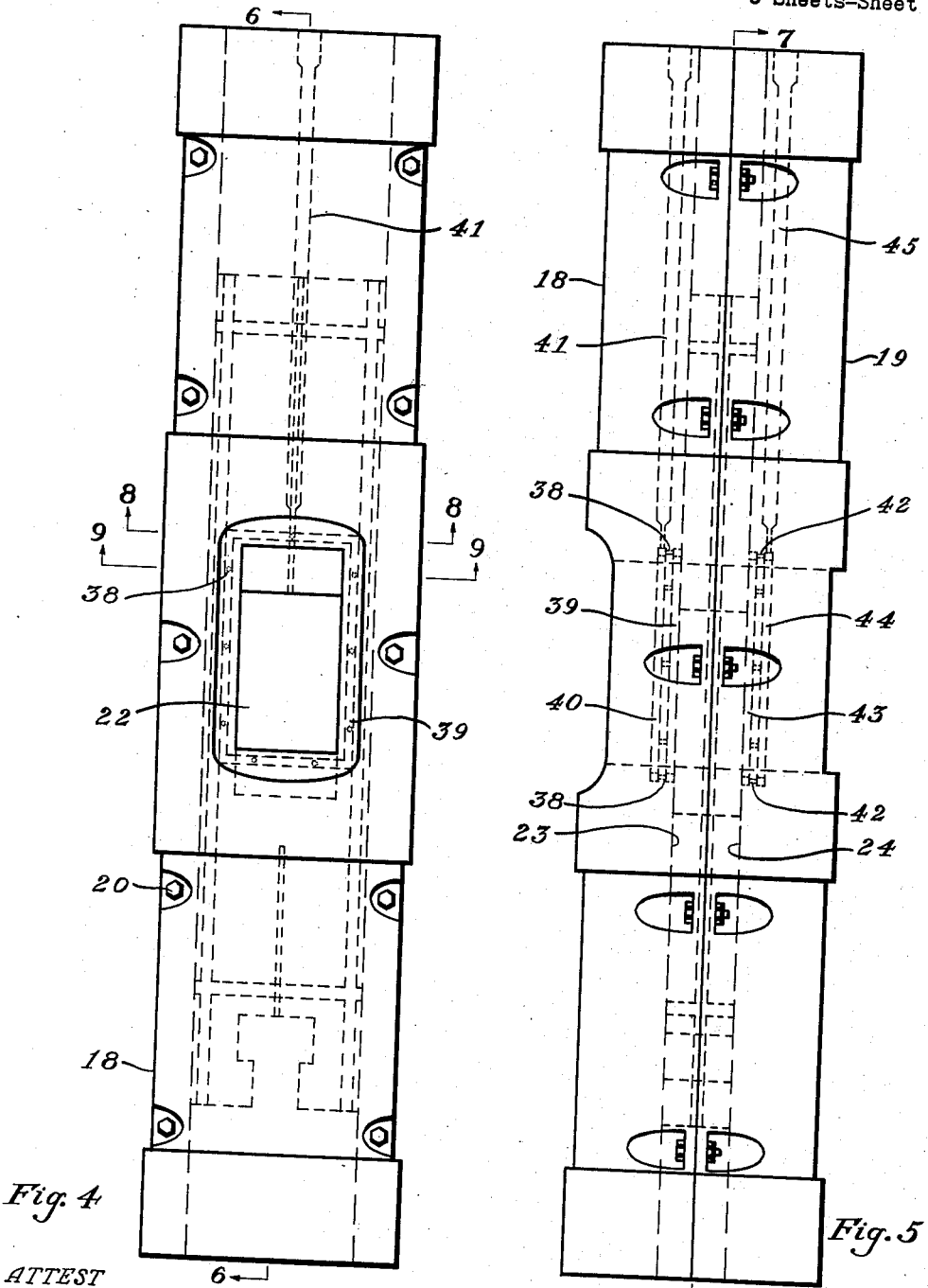
Figure 4 is a plan view of the control member removed from the valve body.
Figure 5 is a side view of the control member shown in Figure 4.
Figure 8:
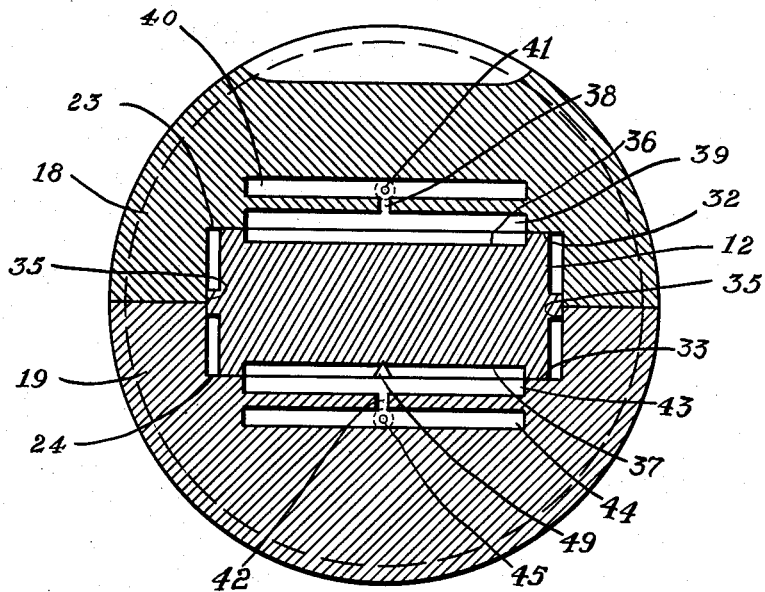
Figure 8 is an enlarged cross-sectional view taken along the line 8—8 of Figure 4.
Figure 9:
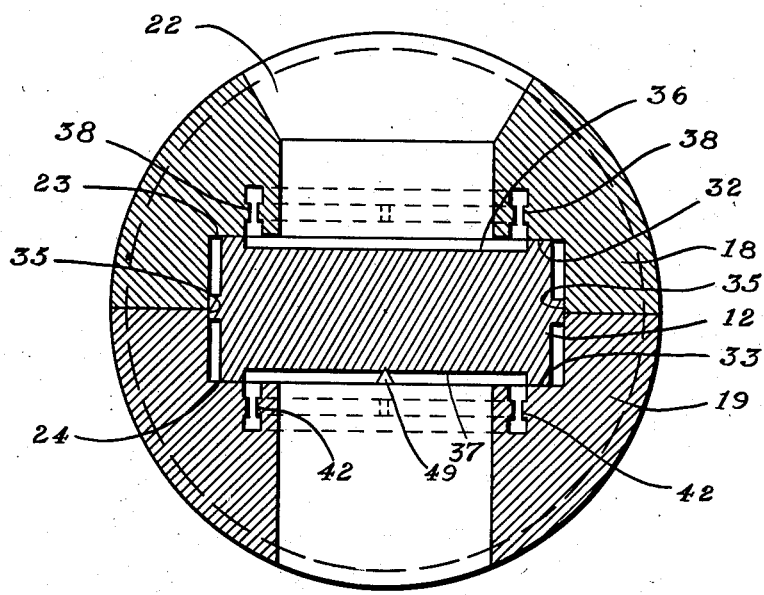
Figure 9 is an enlarged cross-sectional view taken along the line 9—9 of Figure 4.

Figures 1 to 3, inclusive, the valve includes valve body 1, having formed therein axial opening 2 through which flows the fluid to be controlled, and also laterally extending cylinder 3 adapted to receive in sealing engagement a control member which will be described more fully hereinafter. That portion of axial opening 2 extending through cylinder 3 is of reduced diameter so as to provide a desired pressure differential across the valve when fully open. It is readily seen that by proper selection of opening 2 the instantaneous pressure drop across the valve may be controlled within a desired range of pressures by manipulation of the control member. For connecting the valve in a pipe or line, not shown, through which flows the fluid to be controlled, there are formed, respectively, at the upstream and the downstream ends of the valve flanges 4 and 5 which may be secured by any suitable means such, for example, as bolts, not shown, to corresponding parts of successive sections of the pipe.

Throats 6 and 7 may be detachably secured in opening 2 at the upstream and downstream ends, respectively, of the valve for streamlining the flow of fluid therethrough, each of the throats, throat 6, for example, terminating at one of its ends in a flange 8 resting in circumferential groove 9 formed in the associated flange, flange 4, of valve body 1, and secured at its other end, as at 10, in the reduced portion of opening 2, in cylinder 3.

The control member comprises gate enclosing and sealing member, or barrel 11, and valve gate 12, and is confined in cylinder 3 which is closed at its ends by end plates 13 and 14 secured, respectively, by bolts or rivets or other suitable means, not shown, to flanges 15 and 16 formed at either end of cylinder 3. It will be noted that circumferential, raised surfaces 17 are formed exteriorly on barrel 11 and at either of its ends and adjacent opening 2 in cylinder 3 whereby the barrel is tightly sealed within the cylinder but, due to the relatively small sealing surface, is readily removable for purpose of repairing and the like.

Barrel 11, shown in detail in Figures 4 to 9, inclusive, preferably comprises two hemicylindrical members 18 and 19 secured together by a series of bolts 20, for example. An axial opening 21 of rectangular cross-section extends through barrel 11, and is adapted to receive valve gate 12 for slidable movement therein in a plane normal to the axis of aperture 22 formed in barrel 11 and corresponding with opening 2 in the valve body, the sides of axial opening 21 forming seating surfaces 23 and 24 in members 18 and 19, respectively, for gate 12. Key 25 (Figure 2) may be employed for maintaining barrel 11 in a position in valve body 1 such that aperture 22 is at all times in registering relationship with opening 2.

Referring particularly to Figures 2 and 10 to 12, inclusive, valve gate 12 preferably comprises a single elongated member, at one end of which is formed a T-slot 26 adapted to grip a complementary end of gate stem 27. Gate stem 27 extends exteriorly of the valve through a suitable bore 28 in end plate 14 whereby gate 12 may be manipulated, as desired. Intermediate the length of gate 12 there is formed aperture 29 which provides a pair of leading edges, namely, edges 30 and 31, for controlling the flow of fluid through the valve. It is understood that the length of gate 12 is such as to permit, by proper manipulation of gate stem 27, either of the leading edges to control the flow of fluid.

Formed on either face of gate 12 and extending longitudinally thereof are pairs of raised surfaces, surfaces 32 and 33, in the form of bands, as shown. Similarly, a pair of surfaces 34 extend transversely about gate 12 adjacent either end thereof. In addition, raised surfaces 35 are formed on either side of gate 12 extending longitudinally thereof, as shown. Surfaces 32 to 34, inclusive, are adapted to seat on seating surfaces 23 and 24 of barrel 11, and due to the relatively small contact area, the close clearances therebetween may be reduced to a minimum without adversely affecting the facility of manipulation of gate 12. It is preferable to have a clearance between these surfaces and seating surfaces 23 and 24 of the order of 0.004 inch. With clearances of this order, the fluid catalyst flowing through the valves is prevented from passing between these surfaces, and ready and easy manipulation of gate 12 is possible. The clearance between surfaces 35, formed on either side of gate 12, and the associated surfaces of barrel 11 preferably is of the order of 0.003 inch.

It is readily seen that raised surfaces 32 to 34, inclusive, define or form boundaries of relief areas 36 and 37 on the faces of gate 12. It is the purpose of this invention to provide means for continuously introducing aeration fluid between seating surfaces 23 and 24, and relief areas 36 and 37, respectively, in a manner so as to maintain them substantially free of the fluid catalyst being controlled by the valve. To this end a plurality of orifices 38 are formed in hemicylindrical member 18 about aperture 22 and inwardly of raised surfaces 32 of gate 12, as shown, each of the orifices communicating at one of its ends with groove 39 formed in seating surface 23 of member 18. The other ends of the orifices communicate with passage 40 which, in turn, communicates with longitudinally extending passage 41 terminating in one end of barrel 11. It is readily seen that aeration fluid introduced into passage 41 will flow therethrough to passage 40, and thence through orifices 38 into groove 39 from which the fluid is directed into the space between seating surface 23 and relief area 36.

In like manner, a plurality of orifices 42 are formed in hemicylindrical member 19 about aperture 22 and inwardly of raised surfaces 33, each of the orifices communicating at one of its ends with groove 43 formed in seating surface 24. The other ends of orifices 42 communicate with passage 44 which, in turn, communicates with longitudinally extending passage 45 terminating, preferably, in the same end of barrel 11 as passage 41.

Referring particularly to Figure 2, ports 46 and 47 are drilled, or otherwise formed in end plate 13 for continuously supplying aeration fluid from a suitable source, not shown, to passages 41 and 45 whence the fluid is caused to be expelled from the grooves, as pointed out hereinbefore. It is understood that with the valve open, aeration fluid will be expelled from grooves 39 and 43, respectively, into the space between seating surface 23 and relief area 36, and between seating surface 24 and relief area 37, thereby continuously sweeping the spaces free of the fluid catalyst, and diverting the catalyst into aperture 22 away from the seating surfaces to retard erosion and corrosion of the latter. It should be noted that the size of orifices 38 and 42 relative to passages 40, 41, 44, and 45 is such that, regardless of the position of gate 12, aeration fluid will be ejected from each of the orifices.

It is thus seen that the fluid catalyst is prevented substantially from passing between seating surfaces 23 and 24, and gate 12. Under unusual conditions, however, some of the catalyst might pass beyond raised surfaces 34 and be deposited on seating surface 24, thereby jamming gate 12 tightly in barrel 11. This difficulty is obviated by providing grooves 48 and 49 on the lower surface of gate 12, which grooves extend inwardly from the ends of the gate to communicate with relief area 37 and are in communication with the exterior of the valve through ports 50 and 51 provided in end plates 13 and 14, respectively, whereby aeration fluid from a suitable source, not shown, is introduced through ports 50 and 51 into the associated grooves, grooves 48 and 49, respectively whence the aeration fluid passes into relief area 37 sweeping the aforementioned deposited catalyst from seating surface 24 into aperture 22. It is preferable to provide a space 52, as shown in Figure 2, between the end of barrel 11 and end plate 14 so that barrel 11 will not interfere with the seating of end plate 14 on flange 16 and also to connect port 50 with groove 48. It should be pointed out that a suitable packing means, not shown, is disposed in the annular space 53 between end plate 14 and gate stem 27 in a manner to prevent aeration fluid injected through port 50 from escaping therethrough.

It is to be understood that the aeration fluid may be air or any other suitable gas, such, for example, as nitrogen or steam. It is to be further understood that although the valve has been described as employed for controlling the flow of fluid catalyst through a pipe, the invention is not to be construed as so limited, but may be employed in any instance where it is desirable to control the fluid flow in a pipe or line.

We claim:

1. In a valve, a valve body having an opening through which flows the fluid to be controlled, and a control member removably secured within the valve body said control member comprising a gate enclosing and seating member provided with seating surfaces and an aperture in registering relationship with said opening, each of said seating surfaces having formed therein a groove completely surrounding said aperture, a valve gate mounted for slidable movement in said enclosing and seating means and adapted for seating on said seating surfaces, a plurality of orifices formed in said enclosing and seating member about said aperture, each of said orifices communicating at one of its ends with the groove in one of said seating surfaces, first passage means formed in the gate enclosing and seating member and communicating with said orifices for continuously passing aeration fluid through the grooves formed in the seating surfaces and thence between the surfaces of the valve gate and the seating surfaces, longitudinally extending grooves provided in said valve gate, and second passage means associated with said longitudinally extending grooves for continuously introducing aeration fluid through said longitudinally extending grooves and thence between the surfaces of said valve gate and the seating surfaces whereby the surfaces are maintained substantially free of the first mentioned fluid.

2. In a valve a valve body having an opening through which flows the fluid to be controlled, and a control member removably secured within the valve body, said control member comprising a gate enclosing and seating member provided with seating surfaces and an aperture in registering relationship with said opening, an elongated valve gate provided with an aperture intermediate the length thereof forming a pair of leading edges, a plurality of raised surfaces on said valve gate for engagement with the seating surfaces, said raised surfaces defining relief areas between said seating surfaces and said valve gate, a plurality of orifices formed in said enclosing and seating member about the first mentioned aperture and communicating with said relief areas, longitudinally extending grooves provided in said valve gate and communicating with said relief areas, and means associated with said orifices and said grooves for continuously introducing aeration fluid therethrough into the relief areas whereby said areas are maintained substantially free of the first mentioned fluid and erosion of said leading edges is retarded.

3. In a valve a valve body having an opening through which flows the fluid to be controlled, and a control member removably secured within the valve body, said control member comprising a gate enclosing and seating member provided with seating surfaces and an aperture in registering relationship with said opening, an elongated valve gate provided with an aperture intermediate the length thereof forming a pair of leading edges, a plurality of raised surfaces on said valve gate for engagement with the seating surfaces, said raised surfaces defining relief areas between said seating surfaces and said valve gate, a plurality of orifices formed in said enclosing and seating member about the first mentioned aperture and communicating with said relief areas, longitudinal passages in said enclosing and seating member and extending inwardly from an end thereof, each of said longitudinal passages communicating with those orifices which in turn communicate with one of said relief areas, longitudinally extending grooves provided in said valve gate and communicating with said relief areas, and a plurality of input ports provided in said valve body and associated respectively with said longitudinal passages and said grooves for continuously introducing aeration fluid therethrough into the relief areas whereby said areas are maintained substantially free of the first mentioned fluid and erosion of said leading edges is retarded.

4. In a valve a valve body having an opening through which flows fluid to be controlled and a chamber to receive a control member, and a control member removably secured within the chamber, the control member comprising a valve gate enclosing and seating member provided with seating surfaces and an aperture in registering relationship with the opening in the valve body, a valve gate mounted for slidable movement in the enclosing and seating member and adapted for seating on the seating surfaces, an aperture provided intermediately of the length of the valve gate forming a pair of control surfaces, means for manipulating the valve gate for selectively controlling flow of fluid through the valve by means of one of the control surfaces, and raised surfaces formed exteriorly on the enclosing and seating member adjacent the aperture therein for contacting the valve body and for preventing flow of fluid therebetween.

5. In a valve a valve body having an opening through which flows fluid to be controlled and a chamber to receive a control member, and a control member removably secured within the chamber, the control member comprising a valve gate enclosing and seating member provided with seating surfaces and an aperture in registering relationship with the opening in the valve body, each of said seating surfaces having formed therein a groove completely surrounding said aperture, a valve gate mounted for slidable movement in the enclosing and seating member and adapted for seating on the seating surfaces, raised surfaces formed exteriorly on the enclosing and seating member adjacent the aperture therein for contacting the valve body and for preventing flow of fluid therebetween, and interconnecting passage means formed in the gate enclosing and seating member and communicating with said grooves for continuously introducing aeration fluid through said grooves and between the surfaces of the valve gate and the seating surfaces whereby the surfaces are maintained substantially free of the first mentioned fluid.

6. In a valve a valve body having an opening through which flows fluid to be controlled and a chamber to receive a control member, and a control member removably secured within the chamber, the control member comprising a valve gate enclosing and seating member provided with seating surfaces and an aperture in registering relationship with the opening in the valve body, each of said seating surfaces having formed therein a groove completely surrounding said aperture, a valve gate mounted for slidable movement in the enclosing and seating member and adapted for seating on the seating surfaces, raised surfaces formed exteriorly on the enclosing and seating member adjacent the aperture therein for contacting the valve body and for preventing flow of fluid therebetween, and a plurality of orifices formed in the enclosing and seating member and communicating with said grooves for continuously introducing aeration fluid through said grooves and between the surfaces of the valve gate and the seating surfaces whereby the surfaces are maintained substantially free of the first mentioned fluid.

7. In a valve a valve body having an opening through which flows fluid to be controlled and a chamber to receive a control member, and a control member removably secured within the chamber, the control member comprising a valve gate enclosing and seating member provided with seating surfaces and an aperture in registering relationship with the opening in the valve body, each of said seating surfaces having formed therein a groove completely surrounding said aperture, a valve gate mounted for slidable movement in the enclosing and seating member and adapted for seating on the seating surfaces, raised surfaces formed exteriorly on the enclosing and seating member adjacent the aperture therein for contacting the valve body and for preventing flow of fluid therebetween, a plurality of orifices formed in the enclosing and seating member about the aperture, each of said orifices communicating at one of its ends with the groove formed in one of the seating surfaces, first passage means formed in the gate enclosing and seating member and communicating with said orifices for continuously passing aeration fluid through the grooves formed in the seating surfaces and thence between the surfaces of the valve gate and the seating surfaces, longitudinally extending grooves provided in the valve gate, and second passage means associated with said longitudinally extending grooves for continuously introducing aeration fluid through said longitudinally extending grooves and thence between the surfaces of the valve gate and the seating surfaces whereby the surfaces are maintained substantially free of the first mentioned fluid.

8. In a valve a valve body having an opening through which flows fluid to be controlled and a chamber to receive a control member, and a control member removably secured within the chamber, the control member comprising a valve gate enclosing and seating member provided with seating surfaces and an aperture in registering relationship with the opening in the valve body, each of said seating surfaces having formed therein a groove completely surrounding said aperture, a valve gate mounted for slidable movement in the enclosing and seating member and adapted for seating on the seating surfaces, an aperture provided intermediately of the length of the valve gate forming a pair of control surfaces, means for manipulating the valve gate for selectively controlling flow of fluid through the valve by means of one of the control surfaces, raised surfaces formed exteriorly on the enclosing and seating member adjacent the aperture therein for contacting the valve body and for preventing flow of fluid therebetween, a plurality of orifices formed in the enclosing and seating member about the aperture, each of said orifices communicating at one of its ends with the groove formed in one of the seating surfaces, first passage means formed in the gate enclosing and seating member and communicating with said orifices for continuously passing aeration fluid through the grooves formed in the seating surfaces and thence between the surfaces of the valve gate and the seating surfaces, longitudinally extending grooves provided in the valve gate, and second passage means associated with said longitudinally extending grooves for continuously introducing aeration fluid through said longitudinally extending grooves and thence between the surfaces of the valve gate and the seating surfaces whereby the surfaces are maintained substantially free of the first mentioned fluid.

9. In a valve a valve body having an opening through which flows the fluid to be controlled, and a control member removably secured within the valve body, said control member comprising a gate enclosing and seating member provided with seating surfaces and an aperture in registering relationship with said opening, each of said seating surfaces having formed therein a groove completely surrounding said aperture, a valve gate mounted for slidable movement in said enclosing and seating member with at least a portion of said gate at all times seated on said seating surfaces, and means formed in said gate enclosing and seating member for continuously introducing aeration fluid through said grooves and thence between the seated portion of said valve gate and the seating surfaces whereby the surfaces are maintained substantially free of the first mentioned fluid.

10. In a valve a valve body having an opening through which flows the fluid to be controlled, and a control member removably secured within the valve body, said control member comprising a gate enclosing and seating member provided with seating surfaces and an aperture in registering relationship with said opening, each of said seating surfaces having formed therein a groove completely surrounding said aperture, a valve gate mounted for slidable movement in said enclosing and seating member with at least a portion of said gate at all times seated on said seating surfaces, and means for continuously introducing aeration fluid through said grooves and thence between the seated portion of said valve gate and the seating surfaces whereby the surfaces are maintained substantially free of the first mentioned fluid, said last named means comprising a plurality of orifices formed in said enclosing and seating member about said aperture, each of said orifices communicating at one of its ends with the groove formed in one of said seating surfaces.

WILLIAM T. HIRSCH.
ERNEST R. ROTH.

References Cited in the file of this patent

UNITED STATES PATENTS

| Number | Name | Date |
|---|---|---|
| 1,112,066 | Hollis | Sept. 29, 1914 |
| 1,319,006 | Kimball | Oct. 14, 1919 |
| 1,780,828 | Leach et al. | Nov. 4, 1930 |
| 1,825,544 | Redding | Sept. 29, 1931 |

FOREIGN PATENTS

| Number | Country | Date |
|---|---|---|
| 46,711 | Denmark | of 1933 |
| 51,394 | Denmark | of 1936 |
| 508,737 | Germany | of 1929 |
| 679,464 | France | of 1930 |